United States Patent [19]
Sakaki et al.

[11] 4,287,976
[45] Sep. 8, 1981

[54] ELECTROMAGNETIC CLUTCHES

[75] Inventors: Masakatsu Sakaki; Nobuaki Saegusa, both of Isesaki, Japan

[73] Assignee: Sankyo Electric Company Limited, Isesaki, Japan

[21] Appl. No.: 37,237

[22] Filed: May 8, 1979

[51] Int. Cl.[3] .................... F16D 27/10; F16H 55/36
[52] U.S. Cl. ................... 192/84 C; 474/170; 474/902
[58] Field of Search .............. 192/84 C, 84 A, 84 B; 74/230.3, 230.5, 230.05; 29/159 R, 527.5; 474/170, 174, 166, 168, 177, 902

[56] References Cited

U.S. PATENT DOCUMENTS

| | | | |
|---|---|---|---|
| 182,747 | 3/1918 | Ollard | 74/230.5 |
| 1,615,170 | 1/1927 | Evans | 74/230.3 |
| 3,044,594 | 7/1962 | Bernard | 192/84 C |
| 3,082,933 | 3/1963 | Bernard | 192/84 C X |
| 4,004,335 | 1/1977 | Pierce et al. | 29/159 R |
| 4,122,930 | 10/1978 | Bennett et al. | 192/84 C |

FOREIGN PATENT DOCUMENTS

| | | | |
|---|---|---|---|
| 467872 | 12/1951 | Italy | 74/230.05 |
| 716318 | 10/1954 | United Kingdom | 74/230.05 |

Primary Examiner—Rodney H. Bonck
Attorney, Agent, or Firm—Hopgood, Calimafde, Kalil, Blaustein & Judlowe

[57] ABSTRACT

An electromagnetic clutch including a pulley which is rotated by an external power source through a belt or belts for selectively transmitting the rotation of the pulley to a drive shaft by electromagnetically attracting a magnetic armature supported on the drive shaft. The pulley has a magnetic annular body rotatably supported and a belt-receiving groove member of aluminum alloy formed onto the outer surface of the magnetic annular body by die casting and integrated with the magnetic annular body. The construction improves the weight, cost and simplifies the method of production of the pulley without degrading the performance and balance of the pulley.

3 Claims, 5 Drawing Figures

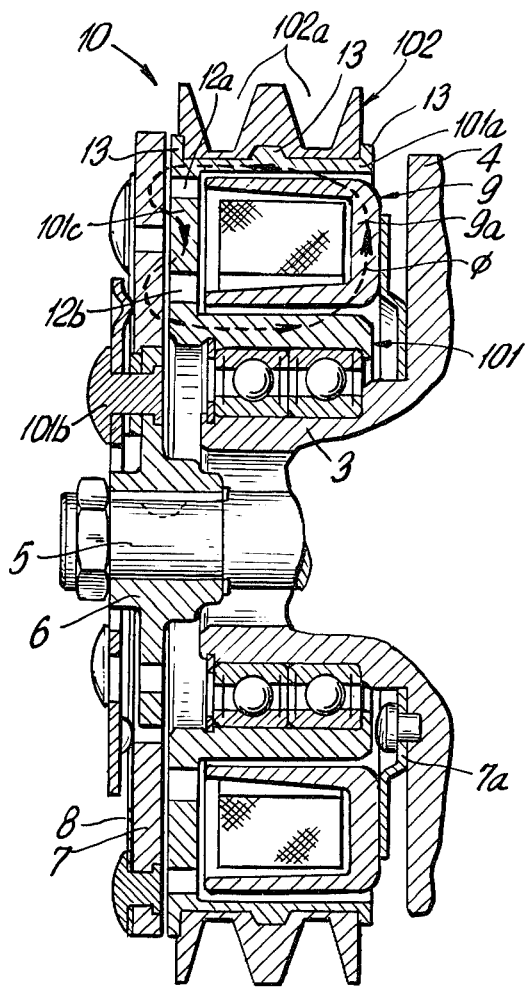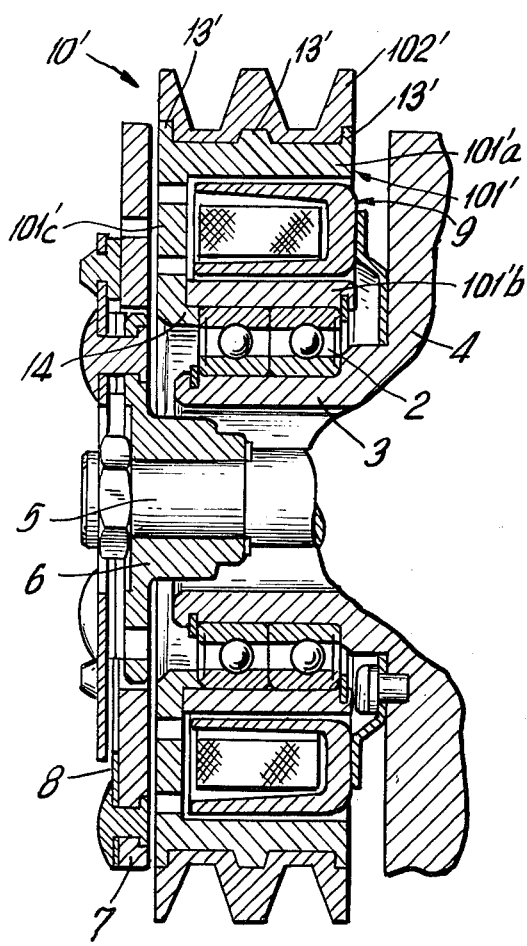
FIG. 3  FIG. 4
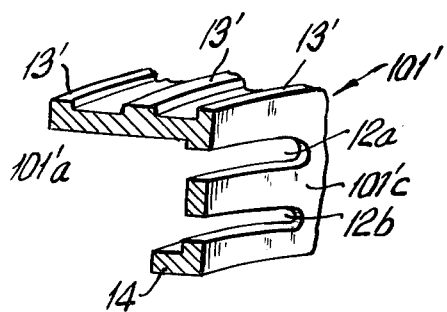
FIG. 5

ELECTROMAGNETIC CLUTCHES

BACKGROUND OF THE INVENTION

This invention relates to electromagnetic clutches and, in particular to clutches, for use in driving refrigerant compressors for automobile air conditioning systems.

FIG. 1 illustrates, a known electromagnetic clutch which is used between the engine and the compressor for selectively driving the compressor; and includes a pulley 1 which is mounted on a bearing 2 mounted on a tubular extension 3 of a compressor housing 4 and which is rotated by a belt shown by an dotted line from the automobile engine (not shown), as disclosed in, for example, in U.S. Pat. Nos. 3,044,594 and 3,082,933.

Pulley 1 is provided with a plurality of concentric annular magnetic pole faces 1a at an axial end thereof. A drive shaft 5 of the compressor extends through tubular extension 3. A hub 6 is fixed to the extending terminal end of the drive shaft 5, and an annular armature plate 7 is joined by leaf springs 8 to hub 6 so that the armature plate 7 faces the annular concentric pole faces with an axial space therebetween. An electromagnet 9 is mounted on tubular extension 3, and is stationarily disposed within an annular hollow portion formed in pulley 1 to supply magnetic flux for attracting armature plate 7 to magnetic pole faces 1a.

Thus, when electromagnet 9 is energized, drive shaft 5 is rotated together with pulley 1 by the engine output, and when electromagnet 9 is not energized, pulley 1 is rotated by the engine but the compressor is not driven.

In such known electromagnetic clutches, the pulley has been formed as a body of magnetic material such as steel by forging followed by machining. However, the resultant pulley is relatively heavy so that the total weight of the compressor is increased. This means that the load on the driving power source, the automobile engine, is increased. Furthermore, since the pulley has a relatively complex shape, it takes a long time to form the pulley. That is, the pulley is formed through a long forging process and is finished to accurate dimensions through a machining step. In the machining step, a large amount of material is removed. Therefore, in the known method for producing the pulley, much material is wasted. Thus, the cost of the electromagnetic clutch is increased.

Referring to FIG. 2, another known method of producing the pulley is to seperately produce an annular magnetic main body 11a and an annular V-groove member 11b by a press forming method, both of which are welded to one another after the main body 11a is fitted into the annular V-groove member 11b. In this method, it is difficult to provide that the used welding agent is uniformly deposited between the main body and the V-groove member. Furthermore, the V-groove member is often thermally deformed in the welding step, and the resultant pulley is thereby unbalanced.

SUMMARY OF THE INVENTION

A general object of this invention is to provide an electromagnetic clutch of reduced weight and of lowered cost.

Another object of this invention is to provide a light pulley for an electromagnetic clutch which is simple in construction and which is readily produced with less waste of material in order to realize the above object.

According to this invention, an electromagnetic clutch is provided which comprises a first magnetic rotatable member rotatably supported on first bearing means, the first rotatable member being provided with at least one annular groove in the outer surface thereof for receiving belt means operatively connected to an external driving power source to be rotated by the external driving power source and having axial end magnetic friction surfaces. A second rotatable member is rotatably supported on second bearing means, an annular magnetic member is supported on the second rotatable member so as to be capable of limited axial movement and having an axial end surface which faces the magnetic friction surfaces of the first magnetic rotatable member with an axial gap therebetween. An electromagnetic means associated with one of the first rotatable member is provided and the annular magnetic member for attracting the other member. The first rotatable member includes an annular body of magnetic material, and a pulley member, or a belt-receiving groove in the outer surface thereof which is formed of aluminum alloy onto the outer surface of the annular magnetic body by casting.

The magnetic annular body may be formed as an integrated body comprising an outer annular cylindrical portion, an inner annular cylindrical portion and an axial end annular plate portion connecting the outer and inner annular cylindrical portions to define an annular hollow portion. The aluminum pulley member is made by casting onto the outer surface of the outer annular cylindrical portion. In the annular hollow portion, an electromagnet is stationarily disposed as the electromagnetic means.

The inner annular cylindrical portion may be formed of a ring body, separate from the other portions. The ring body is secured to the axial end annular plate portion by welding, brazing or closely fitting an annular boss formed on the axial end annular plate portion into the ring body. The axial end of the annular boss may be used as an axial stopper of the first bearing means on which the ring body is supported.

The magnetic annular body is preferably provided with at least one rough surface region in the outer surface thereof. Furthermore, the magnetic annular body may be provided with at least one radially projecting annular rim on the outer surface thereof. Thus, the die-cast pulley member is strongly secured onto the annular body.

Further objects, features and other aspects of this invention will be understood from following the detailed description of the preferred embodiments of this invention referring to the annexed drawings.

Brief Description of the Drawings

FIG. 3 is a cross-sectional view of an first embodiment of this invention,

FIG. 4 is a cross-sectional view of another embodiment of this invention, and

FIG. 5 is a perspective view partially showing a magnetic annular body used in FIG. 4.

DETAILED DESCRIPTION OF PREFERRED EMBODIMENTS

Figure 1:
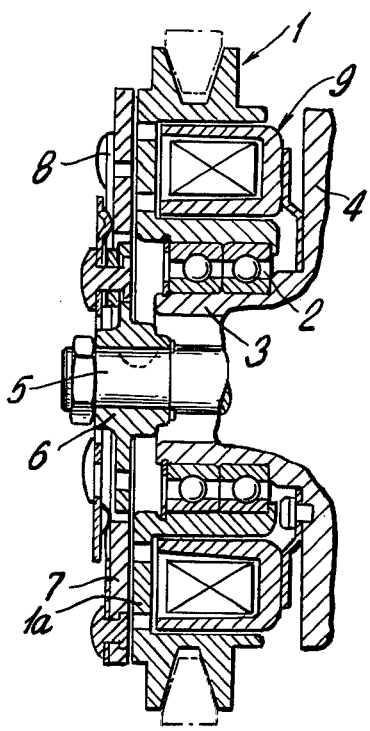
FIG. 1 is a cross-sectional view of a known electromagnetic clutch.
Figure 2:
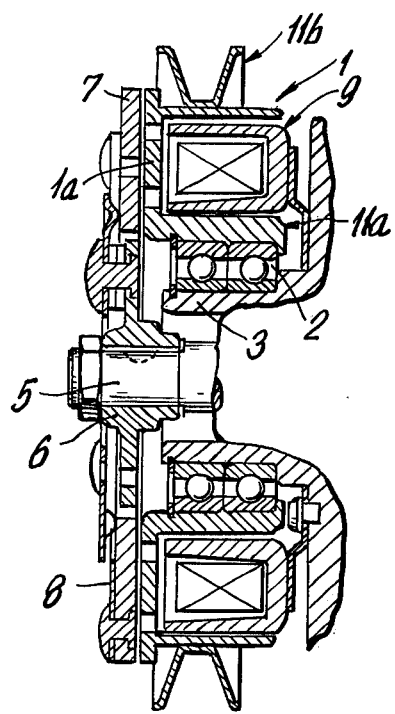
FIG. 2 is a cross-sectional view of another known electromagnetic clutch.

Referring to FIG. 3, the embodiment, shown is similar to the known electromagnetic clutches shown in FIGS. 1 and 2, except for the construction of the pulley. Therefore, similar parts are represented by the same reference characters as in FIG. 1 and the detailed description of the similar parts will be omitted in order to simplify the description.

In the embodiment shown, the pulley 10 comprises an annular magnetic body 101 of material such as steel and an annular pulley member or a belt-receiving groove member 102. Annular magnetic body 101 comprises an outer annular cylindrical portion 101a, an inner annular cylindrical portion 101b and an axial end annular plate portion 101c connecting the outer and inner annular cylindrical portions 101a and 101b. An annular hollow portion is defined by these three portions 101a–101c to stationarily contain the electromagnet 9. The axial end annular plate portion 101c is provided with concentric slits 12a and 12b to form concentric annular magnetic pole faces at an axial end thereof.

Pulley member 102 is constructed from aluminum alloy and is formed with belt-receiving V-grooves 102a on the radial outer surface of annular magnetic body 101 by die casting, as a integrated body with annular magnetic body 101.

As to the aluminum alloy used, only one which is used in aluminum alloy die castings may be used. Aluminum alloys ADC-10 or ADC-12 in JIS (Japanese Industrial Standard) H5302 are preferably used because of their good wear-resistance.

This arrangement, when electromagnet 9 is energized, magnetic flux flows through a closed loop comprising the magnetic housing 9a of electromagnet 9, outer annular cylindrical portion 101a, armature plate 7, axial end plate portion 101c, armature plate 7 and inner annular cylindrical portion 101b, as shown by a broken line φ. Therefore, armature plate 7 is attracted to axial end plate portion 101c, so that drive shaft 5 is rotated together with pulley 10, similar to the known electromagnetic clutch.

In this embodiment, since V-groove member 102 is made of aluminum alloy and is formed by die casting, pulley 10 is lighter in comparison with the known prior electromagnetic clutch as shown in FIG. 1.

Since the annular magnetic body 101 is relatively simple in shape, it can be formed with a relatively high dimensional accuracy by forging. Furthermore, die-cast pulley member 102 also has a relatively high dimensional accuracy. Therefore, although material is removed in a finishing or machining step, the amount removed is reduced in comparison with that of the known pulley shown in FIG. 1. Accordingly, pulley 10 is simply produced in a balanced condition and is low in cost.

Before aluminum die casting pulley member 102 onto annular magnetic body 101, outer surface of the annular magnetic body 101 may be preferably formed with a rough surface entirely or partially, for example, by knurling. Thus, die-cast pulley member 102 is rigidly attached onto the outer surface of annular magnetic body 101 against axial and/or rotating movement. Moreover, annular magnetic body 101 may be also formed with at least one radially projecting annular rim (three rims 13 are shown in FIG. 3). The rim prevents the die-cast pulley member 102 from becoming disengaged from annular magnetic member 101.

The three portions of the annular magnetic body may be separately formed and assembled together to form an annular magnetic body either before or after forming pulley member 102 onto the outer annular cylindrical portion by die casting.

Referring to FIGS. 4 and 5, the outer annular cylindrical portion 101'a and the axial end annular plate portion 101'c are formed of steel as one body by pressing, with the axial end annular plate portion 101'c being provided with an annular axial boss 14 at the radial inner end thereof.

The outer annular cylindrical portion 101'a is provided with three radially extending annular rims 13' on the outer surface thereof. The outer surface including the top surface of a rim 13' is knurled.

A pulley member 102' is formed onto the outer surface of outer annular cylindrical portion 101'a by aluminum alloy die casting.

The inner annular cylindrical portion is made of material a ring body 101'b of such as steel. The ring body 101'b is assembled with, and secured to, the body 101'a–101'c, by welding or brazing after the fitting of the annular boss 14 into ring body 101'b.

In this embodiment, the axial projecting end of the axial annular boss serves as an axial stopper of the bearing 3 on which the pulley 10 is mounted.

In the embodiment, since the pulley is produced by pressing an annular body comprising outer annular cylindrical portion 101'a and axial end annular plate portion 101'c, die casting the pulley member 102', and assembling the ring body 101'b, the production of the pulley is simpler than that of the aforementioned embodiment and the material wasted is reduced.

In above mentioned embodiments, the pulley member of aluminum alloy is formed on the annular magnetic body by diecasting. But any other casting methods such as gravity casting may be employed in which the pulley member is formed on the annular magnetic body as a body integrated with the annular magnetic body. In gravity casting, aluminum alloy AC-8-A, AC-8-B or AC-8-C of JIS H5202 is usable.

This invention has been described in detail in connection with preferred embodiments, but these are merely for example only and this invention is not restricted thereto. It will be easily understood by those skilled in the art that the other variations and modifications can be easily made within the scope of this invention.

What we claim is:

1. In an electromagnetic clutch which includes a first magnetic rotatable member rotatably supported on first bearing means, said first rotatable member being provided with at least one annular groove in the outer surface thereof for receiving belt means operatively connected to an external power source to be rotated by the external power source and having axial end magnetic friction surfaces, a second rotatable member rotatably supported on second bearing means, an annular magnetic member being supported on said second rotatable member so as to be capable of limited axial movement and having an axial end surface which faces said magnetic friction surfaces of said first magnetic rotatable member with an axial gap therebetween, and electromagnetic means associated with one of said first rotatable member and said annular magnetic member for attracting the other member, the improvement comprising said first rotatable member having an annular body of magnetic material, a pulley member having said belt-receiving groove in the outer surface thereof which is formed of aluminum alloy, said pulley member being disposed on the outer surface of said annular magnetic body by casting, said annular magnetic body having an outer annular portion and an inner annular ring, an axial end annular plate portion integral with said outer annular portion and joining said outer annular portion and said inner annular ring at an axial end thereof to define an annular hollow portion, said electromagnetic means being fixedly disposed in said annular hollow portion, said inner annular ring being joined to said axial end annular plate portion at the radial inner end, said axial end annular plate portion having said axial end magnetic friction surfaces, said axial end annular plate portion having an annular axial boss at the radial inner end thereof, said annular axial boss including an axially projecting end, said annular axial boss being fitted into and fixed to said inner annular ring, and said axially projecting end of said annular axial boss serving as a stopper for preventing axial movement of said first bearing means.

2. The improvement as claimed in claim 1, wherein at least one portion of the outer surface of said outer annular portion is formed with a rough surface.

3. The improvement as claimed in claim 1, wherein said outer annular portion is provided with at least one radially projecting annular rim on the outer surface thereof.

* * * * *